United States Patent [19]

Senoh et al.

[11] 4,227,688
[45] Oct. 14, 1980

[54] EXERCISE ASSEMBLY WITH FLEXIBLE BAR MOUNTING

[76] Inventors: Hisao Senoh; Fushi Senoh, both of 2 - 31 - 13, Shinmachi, Setagaya-Ku, Tokyo, Japan

[21] Appl. No.: 949,206

[22] Filed: Oct. 6, 1978

[51] Int. Cl.³ .............................. A63B 1/00
[52] U.S. Cl. ..................... 272/62; 403/205
[58] Field of Search ............ 272/62, 63, 67, 68, 272/116, 143, DIG. 4; 403/123, 114, 116, 231, 205

[56] References Cited

U.S. PATENT DOCUMENTS

| | | | |
|---|---|---|---|
| 774,393 | 11/1904 | Palmer | 403/205 |
| 820,436 | 5/1906 | Patterson | 403/205 |
| 2,126,443 | 8/1938 | Begley | 403/114 X |
| 2,984,995 | 5/1961 | Kalen | 403/114 X |
| 3,401,951 | 9/1968 | Bloom | 403/116 X |

*Primary Examiner*—Richard C. Pinkham
*Assistant Examiner*—William R. Browne
*Attorney, Agent, or Firm*—Pearne, Gordon, Sessions

[57] ABSTRACT

An exercise assembly with parallel and spaced upright posts, a grip rod spanning the posts and having the opposite end portions movably connected to the posts by means of hollow joints each having a vertical lower pipe section movably receiving the associated end portion of the grip rod and a horizontal pipe section, said opposite end portions of the grip rod having bulges provided with slanted elliptical holes, operation cylinders disposed within said horizontal pipe sections and receiving the opposite end portions of the grip rod, first connector rods received in said operation cylinders and slanted elliptical holes and second connector rods connecting said operation cylinders to said horizontal pipe sections of the joints.

8 Claims, 8 Drawing Figures

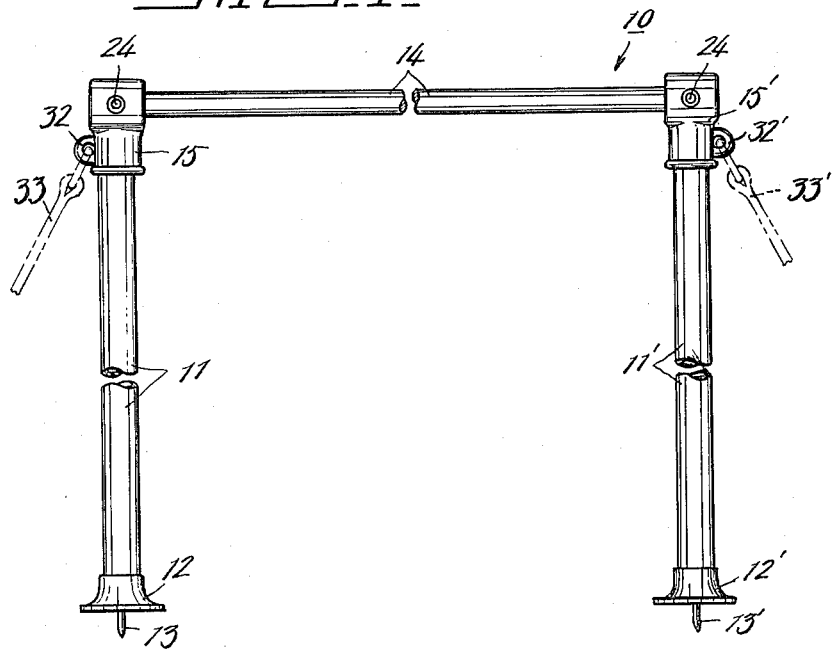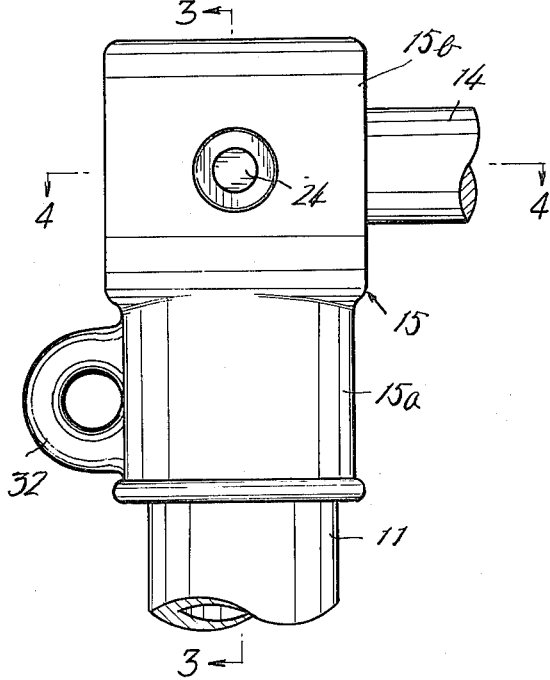

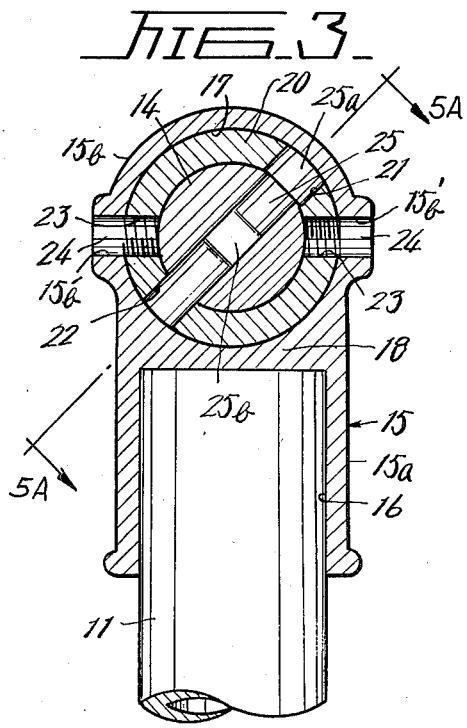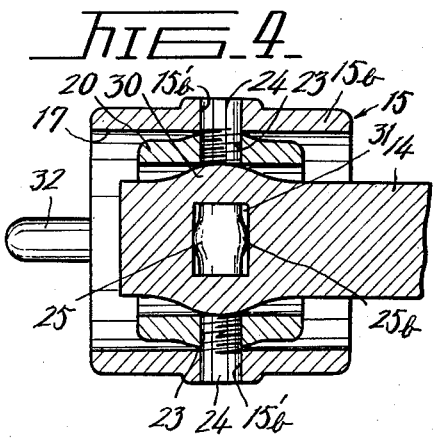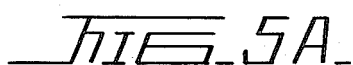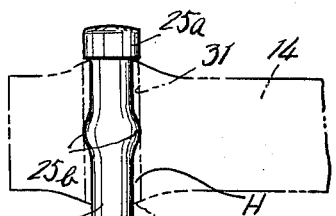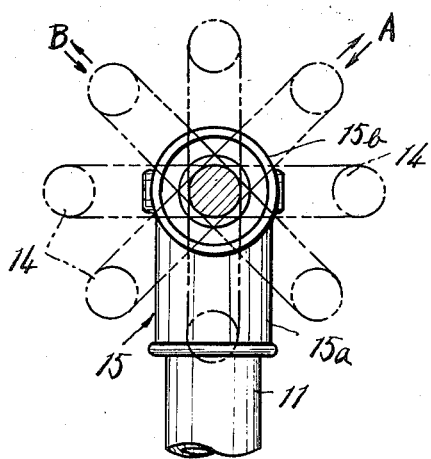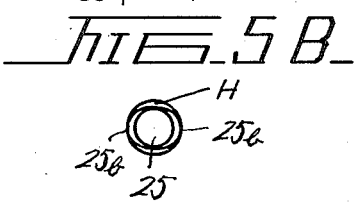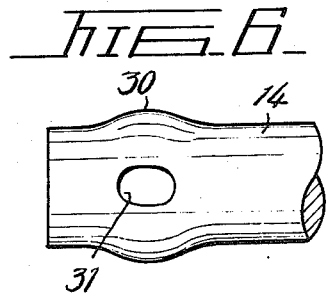

4,227,688

EXERCISE ASSEMBLY WITH FLEXIBLE BAR MOUNTING

BACKGROUND OF THE INVENTION

This invention relates to an exercise bar in which, when subject to a load, the grip rod can bend in intermediate directions between the vertical and horizontal directions as well as the vertical and horizontal directions whereby the user can smoothly exercise chinning without being subjected to any accidental resistance from the grip rod.

There have been proposed and practically employed a variety of exercise bars and most of the conventional exercise bars comprise the grip rod capable of bending in the vertical and horizontal directions to thereby afford the user to exercise resiliently rotational chinning motions. However, in the conventional exercise bars, the bending motions of the grip rod are limited to only four directions by joints which connect the grip rod to support posts, that is, upward and downward bending motions in the vertical direction and leftward and rightward bending motions in the horizontal direction. Thus, when the body of the user assumes the position of an intermediate angle between the vertical and horizontal directions such as 45°, for example, in the course of a rotational chinning exercise describing a parabola, the grip rod can not fully bend in response to the rotational chinning motion of the user in varying directions because the joints do not allow the grip rod to fully respond to such motion of the user in the varying directions resulting in uneven physical bending of the grip rod.

Therefore, one object of the present invention is to provide an exercise bar which can effectively eliminate the disadvantages inherent in the conventional exercise bars.

Another object of the present invention is to provide an exercise bar in which the grip rod can smoothly and resiliently bend in varying directions in the course of a rotational chinning exercise by the user.

The above and other objects and attendant advantages of the present invention will be more readily apparent to those skilled in the art from a reading of the following detailed description in conjunction with the accompanying drawings which show one preferred embodiment of the exercise bar according to the present invention for illustration purpose only, but not for limiting the scope of the same in any way.

BRIEF DESCRIPTION OF THE DRAWINGS

FIG. 1 is a front elevational view of one preferred embodiment of the exercise bar according to the present invention with a portion thereof broken away;

FIG. 2 is a fragmentary elevational view on an enlarged scale of one of the joints and its associated one end portion of the grip rod and the upper end portion of one of the posts as shown in FIG. 1;

FIG. 3 is a vertically sectional view taken substantially along the line 3—3 of FIG. 2;

FIG. 4 is a horizontally sectional view taken substantially along the line 4—4 of FIG. 2;

FIG. 5A is a diagrammatic view on an enlarged scale showing the relationship between one connector rod and the slanted elliptical hole in the associated end portion of the grip rod;

FIG. 5B is an end view of said connector rod as seen from the lower end face of the rod shown in FIG. 5A;

FIG. 6 is a fragmentary view on an enlarged scale of one end portion of the grip rod as shown in FIG. 1 showing the bulge and slanted elliptical hole of the end portion; and FIG. 7 is a diagrammatic view showing the grip rod in varying resiliently bending directions in use.

PREFERRED EMBODIMENT OF THE INVENTION

The present invention will be now described referring to the accompanying drawings in which one preferred embodiment of the exercise bar of the invention is shown for illustration purpose only, but not for limiting the scope of the same in any way. The exercise bar is generally shown by reference numeral 10 and generally comprises a pair of parallel and spaced upright posts 11 and 11' each of which is formed of a pipe. Each of the posts 11, 11' includes a bell-shaped base member 12 or 12' at the lower end adapted to rest on the ground and anchor members 13 of 13' extending downwardly from the associated base member and adapted to be embedded in the ground (only one of the anchor members is shown for the associated post). As is well known in the art, the purpose of the base and anchor members is to position the posts on the ground in stabilized condition. The exercise bar 10 also comprises a horizontal grip rod 14 spanning the posts 11, 11' and movably supported on the opposite end portions at the tops of the posts by means of joints 15, 15', respectively, in the manner as will be described hereinafter. Since the connection arrangements for the opposite end portion of the grip rod 14 are the same, description will be made in connection with one end portion (or the left-hand end portion as seen in FIG. 1) of the grip rod on the understanding that the description can be equally applied to the connection arrangement for the other end portion (or the right-hand end portion) of the grip rod. The joint 15 is formed of two integral pipe sections, that is, a first or vertical pipe section 15a and a second or horizontal pipe section 15b which are separated from each other by means of a partition wall 18. The first pipe section includes a cylindrical bore 16 opening downwardly and freely receiving the upper end portion of the post 11 therein to permit the joint 15 to rotate or pivot about the post by a limited amount as a first pivotal connection and the second pipe section 15b includes a cylindrical bore 17 in which an operation cylinder or sleeve 20 is received for rotation or pivoting by a limited amount. The wall of the operation cylinder 20 is formed with larger and smaller diameter through holes 21 and 22 in two diametrically opposite positions of the cylinder wall at an angle with respect to the horizontal for a purpose to be described hereinafter. The wall of the operation cylinder 20 is also formed with threaded through holes 23, 23 in other two diametrically opposite positions thereof extending in the horizontal direction for receiving the inner end portions of threaded connector rods 24, 24 the plain outer end portions of which are freely and pivotally received in two through holes 15b, 15b' formed in two diametrically opposite positions of the wall of the joint second pipe section 15b in alignment with the threaded holes 23, 23 in the operation cylinder 20 for rotation by a limited amount as a second pivotal connection.

A connector rod 25 is disposed within the operation cylinder 20 and includes an enlarged diameter head 25a on one end portion received in the larger diameter through hole 21 in the operation cylinder 20, the other end portion received in the smaller diameter through hole 22 in the operation cylinder as a third pivotal connection. An elliptical cross-section bulge extends laterally and outwardly in the center of the connector rod.

The grip rod 14 is formed with bulges 30 on the opposite end portions (only the bulge 30 on the left-hand end portion is shown in FIGS. 4, 5 and 6) and slanted through holes 31 of elliptical cross-section formed in the bulges 30 (only the through hole 31 associated with the bulge 30 on the left-hand end portion is shown in FIG. 6). The slanted elliptical hole 31 freely receives the connector rod 25 with the bulge 25b' of the rod in point-contact with the walls of the hole 31 as a fourth pivotal connection and the remaining portions of the rod except for the head 25a spaced from the walls of the hole as shown by reference character H in FIG. 5. The end portion of the grip rod 14 is received within the associated operation cylinder 20 with the bulge 30 in point-contact with the inner end faces of the threaded connector rods 24 as shown in FIG. 4. The inclined elliptical through hole 31 extends from the upper surface to the lower surface of the grip rod 14 at about 45° with respect to the horizontal In FIG. 1 reference numerals 32, 32' denote hooks formed on the joints 15, 15', respectively and reference numerals 33, 33' denote chains or cables having the upper ends anchored to the hooks and the lower ends anchored to suitable anchoring members (not shown).

In use, assuming that the user tries to exercise a rotational chinning and grips the grip rod 14 to first apply a vertical load or force to the grip rod, then, the applied vertical force urges the connector rods 24 to rotate or pivot as the second pivotal connection by a limited amount in response to the force with respect to the joints 15, 15' to thereby rotate or pivot the operation cylinders 20 correspondingly. Such rotation of the operation cylinders 20 is possible from the fact that the operation cylinders 20 are integrally connected to the connector rods 24 within the horizontal pipe sections 15b of the joints 15, 15'. The rotation of the operation cylinders 20 in turn allows the grip rod 14 to resiliently bend in the vertical direction without being subjected to any resistance because the operation cylinders 20 are connected to the grip rod 14 by means of the point-contacting connector rod and slanted hole arrangements 25 and 31.

When the user applies a lateral load or force to the grip rod 14 to resiliently bend the grip rod in the horizontal direction, such bending of the grip rod 14 is possible by the pivoting of the joints 15, 15' about the posts 11, 11' as the first pivotal connection. More particularly, since the first pipe sections 15a, 15a of the joints 15, 15' are freely received on the upper end portions of the posts 11, 11', the joints 15, 15' can rotate about the posts 11, 11' in response to the applied lateral force. Thus, it will be understood that when the grip rod 14 is subjected to a lateral load or force, the joints 15, 15' themselves rotate correspondingly to allow the grip rod 14 to resiliently bend in the horizontal direction.

The above-mentioned vertical and lateral resilient bending modes of the grip rod 14 are based on the same principle as that employed in the conventional exercise bars. However, according to the present invention, in addition to the conventional vertical and lateral bending modes, the grip rod can also bend in intermediate directions between the vertical and horizontal directions.

That is, when a load or force is applied to the grip rod 14 in a slanting direction as shown by the arrow A in FIG. 7, the grip rod 14 resiliently bends about the apices of the bulges 25b of the connector rods 25 as the fulcrums in which rods 25 are received in the slanted elliptical through holes 31 for the fourth pivotal connection, whereby the grip rod 14 is allowed to bend resiliently in the arrow A direction. Such bending of the grip rod 14 is possible from the fact that only the apices of the bulges 25b on the connector rods 25 make point-contact with the walls of the elliptical holes 31 in the grip rod 14 and the clearance H is left between the remaining shank portions of the connector rods 25 on the opposite sides of the bulges 25b of the rods and the associated slanted holes 31 in the grip rod 14.

And when a load or force is applied to the grip rod 14 in a different slanting direction as shown by the arrow B in FIG. 7, the grip rod 14 rotates or pivots together with the connector rods 25 because the heads 25a and the end portions opposite the heads of the connector rods 25 rotate within the respectively associated slanted larger and smaller holes 21, 22 in the operation cylinders 20, respectively, as the third pivotal connection, which in turn rotates the grip rod 14 whereby the grip rod 14 can bend resiliently in the arrow B direction.

As clear from the foregoing description in connection with the preferred embodiment of the invention, according to the present invention, thr grip rod can resiliently bend slantingly in intermediate directions between the vertical and horizontal directions as well as the vertical and horizontal directions whereby the user can smoothly exercise a rotational chinning regardless of the position of the body of the user in the course of the rotational chinning of the user without being subjected to any resistance from the grip rod and thus, the present invention substantially can improve the skill of the user in exercising chinning.

While only one embodiment of the invention has been shown and described in detail, it will be understood that the same is for illustration purpose only and not to be taken as a definition of the invention, reference being had for this purpose to the appended claims.

What is claimed is:

1. An exercise assembly for supporting a user comprising a pair of spaced and parallel upright posts adapted to be supported at the lower ends thereof on a support surface, joints each having a lower vertical pipe section freely pivotable on the upper end portion of the associated post and an upper horizontal pipe section having a pair of diametrically opposite through holes in the wall of said horizontal pipe section, a grip rod for supporting a user during exercise and spanning said posts and having the opposite end portions received in said horizontal pipe sections, said opposite end portions of the grip rod each having a laterally and outwardly extending bulge provided with an elliptical through hole inclined to the horizontal and extending at right angles to the longitudinal axis of said grip rod, operation sleeves disposed within said horizontal pipe sections of the joints and receiving said opposite end portions of the grip rod, each of said operation sleeves having a first pair of diametrically opposite through holes inclined at an angle with respect to the horizontal and a second pair of diametrically opposite horizontal through holes in the wall of the operation sleeve in alignment with said pair of diametrically opposite through holes in the horizontal pipe sections of the associated joint, first connector rods each being pivotally received in said first pair of inclined through holes in the associated operation sleeve, respectively, said each connector rod further having a laterally and outwardly extending bulge of elliptical cross-section in the center of the connector rod freely received in the inclined elliptical through hole in the bulge on the associated end portion of the grip rod, and second connector rods each freely pivotable in the aligned horizontal through holes in the horizontal pipe section of the associated joint and the associated operation sleeve.

2. The exercise assembly for supporting a user as set forth in claim 1, in which said elliptical bulge on the first connector rod is in point-contact with said inclined elliptical through hole in the bulge on the associated end portion of the grip rod as to form a fulcrum about which the grip rod moves.

3. The exercise assembly for supporting a user as set forth in claim 1, wherein said first pair of inclined through holes include one larger than the other, and said first connector rods each having an enlarged head at one end pivotally received in said larger through hole.

4. An exercise assembly for supporting a user comprising a pair of spaced and parallel upright posts adapted to be supported at the lower ends thereof on a support surface, flexible joints each having a lower portion received on the upper end of the associated post, a grip rod for supporting a user during exercise and spanning said posts and having the opposite end portions received in said flexible joints, first pivotal interconnection means between an end of said grip rod and the associated post establishing limited pivotal movement therebetween about a vertical axis when a horizontal force is applied to the rod during exercise, second pivotal interconnection means between an end of said grip rod and the associated post establishing limited pivotal movement therebetween about a horizontal axis when a vertical force is applied to the rod during exercise, third pivotal interconnection means between an end of said grip rod and the associated post establishing limited pivotal movement therebetween about an axis at a substantially 45° angle on one side of the vertical when a slanting force is applied to the rod during exercise, and fourth pivotal interconnection means between an end of said grip rod and the associated post establishing limited pivotal movement therebetween about an axis at a substantially 45° angle on the other side of the vertical when a slanting force is applied to the rod during exercise.

5. An exercise assembly for supporting a user as set forth in claim 4, wherein said first pivotal interconnection means includes a pivot connection between said flexible joint and the respective upright post.

6. An exercise bar as set forth in claim 4, wherein said third pivotal interconnection means includes a connector rod between each end of the grip rod and the respective joint and disposed at an angle inclined from the vertical.

7. An exercise bar as set forth in claim 6, wherein said fourth pivotal interconnection means includes a bulge at the central portion of the connector rod closely received within a through hole in the end of the grip rod.

8. An exercise bar as set forth in claim 4, wherein each of said four pivotal axes is substantially perpendicular to the length dimension of said grip rod.

* * * * *

UNITED STATES PATENT AND TRADEMARK OFFICE
CERTIFICATE OF CORRECTION

PATENT NO. : 4,227,688

DATED : October 14, 1980

INVENTOR(S) : Hisao Senoh and Fushi Senoh

It is certified that error appears in the above—identified patent and that said Letters Patent is hereby corrected as shown below:

Column 2, line 62, delete "15b; 15b'" and insert --15b', 15b'--.

Column 3, line 5, after "bulge", insert --25b--.

Column 6, lines 24, 29 and 33, delete "bar" and insert --assembly for supporting a user--.

Signed and Sealed this

Sixth Day of January 1981

[SEAL]

Attest:

SIDNEY A. DIAMOND

Attesting Officer

Commissioner of Patents and Trademarks